(12) United States Patent
Suzuki

(10) Patent No.: US 7,102,305 B2
(45) Date of Patent: Sep. 5, 2006

(54) APPARATUS AND METHOD FOR CONTROLLING MOTOR

(75) Inventor: Hiroshi Suzuki, Okazaki (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 0 days.

(21) Appl. No.: 10/849,816

(22) Filed: May 21, 2004

(65) Prior Publication Data

US 2004/0232865 A1    Nov. 25, 2004

(30) Foreign Application Priority Data

May 22, 2003   (JP) ............................. 2003-144321

(51) Int. Cl.
    *H02P 27/12*   (2006.01)
(52) U.S. Cl. .................. 318/139; 318/95; 318/138; 318/254; 318/432; 318/439; 318/609; 318/700; 318/701; 318/727; 318/807; 318/809; 318/812
(58) Field of Classification Search ............... 318/85, 318/138, 139, 254, 287, 432, 434, 446, 609, 318/610, 767, 700, 701, 800–812
    See application file for complete search history.

(56) References Cited

U.S. PATENT DOCUMENTS

| | | | | |
|---|---|---|---|---|
| 5,877,603 A * | 3/1999 | Uchida et al. | .............. | 318/434 |
| 5,883,484 A * | 3/1999 | Akao | .......................... | 318/700 |
| 5,955,863 A * | 9/1999 | Iwashita et al. | ............ | 318/812 |
| 5,963,007 A * | 10/1999 | Toyozawa et al. | .......... | 318/799 |
| 6,163,130 A * | 12/2000 | Neko et al. | .................. | 318/806 |
| 6,194,865 B1 * | 2/2001 | Mitsui et al. | ................ | 318/811 |
| 6,281,656 B1 * | 8/2001 | Masaki et al. | .............. | 318/700 |
| 6,570,358 B1 * | 5/2003 | Nakatsugawa et al. | ..... | 318/727 |
| 6,593,714 B1 * | 7/2003 | Nagayama | .................. | 318/254 |
| 6,611,127 B1 * | 8/2003 | Arimitsu et al. | ............ | 318/801 |
| 6,630,804 B1 * | 10/2003 | Moriya et al. | ................ | 318/85 |
| 6,639,379 B1 * | 10/2003 | Matsushita et al. | ......... | 318/727 |
| 6,642,689 B1 * | 11/2003 | Ishida et al. | ................ | 318/807 |
| 6,674,262 B1 * | 1/2004 | Kitajima et al. | ............ | 318/722 |
| 6,696,812 B1 * | 2/2004 | Kaneko et al. | ............. | 318/700 |
| 6,727,675 B1 * | 4/2004 | Yoshimoto et al. | ......... | 318/700 |
| 6,741,063 B1 * | 5/2004 | Sakai et al. | ................. | 318/809 |
| 6,768,280 B1 * | 7/2004 | Kitajima | ..................... | 318/432 |
| 6,777,897 B1 * | 8/2004 | Murai | ........................ | 318/138 |

(Continued)

FOREIGN PATENT DOCUMENTS

JP     2001008499 A  *  1/2001

*Primary Examiner*—Rina Duda
*Assistant Examiner*—Robert W. Horn
(74) *Attorney, Agent, or Firm*—Oblon, Spivak, McClelland, Maier & Neustadt, P.C.

(57) ABSTRACT

A motor control apparatus includes a direct-current power source and an inverter circuit, which includes a switching element. The motor control apparatus receives a current command value in every control cycle and calculates a current deviation accumulated value by accumulating the current deviation between the received current command value and the actual current value that flows through a coil of a motor. The motor control apparatus then computes a voltage command value in accordance with the current deviation accumulated value and controls the switching timing of the switching element based on the voltage command value. The motor control apparatus judges whether the computed voltage command value exceeds a range of the voltage that can be output from the inverter circuit and causes saturation. If it is judged that the voltage command value is saturated, the motor control apparatus restricts the accumulation of the current deviation.

21 Claims, 10 Drawing Sheets

U.S. PATENT DOCUMENTS

| | | | |
|---|---|---|---|
| 6,788,024 B1* | 9/2004 | Kaneko et al. | 318/807 |
| 6,809,492 B1* | 10/2004 | Harakawa et al. | 318/609 |
| 6,812,660 B1* | 11/2004 | Takahashi et al. | 318/254 |
| 6,822,417 B1* | 11/2004 | Kawaji et al. | 318/701 |
| 6,831,440 B1* | 12/2004 | Royak et al. | 318/727 |
| 6,841,968 B1* | 1/2005 | Sato et al. | 318/727 |
| 6,844,700 B1* | 1/2005 | Sakai et al. | 318/801 |
| 6,850,031 B1* | 2/2005 | Nakata et al. | 318/801 |
| 6,861,813 B1* | 3/2005 | Yoshimoto et al. | 318/432 |
| 6,963,182 B1* | 11/2005 | Suzuki | 318/254 |
| 7,034,483 B1* | 4/2006 | Takahashi et al. | 318/432 |
| 2002/0149342 A1* | 10/2002 | Nakata et al. | 318/801 |
| 2003/0001536 A1* | 1/2003 | Kitajima | 318/629 |
| 2003/0090231 A1* | 5/2003 | Yoshimoto et al. | 318/635 |
| 2004/0104697 A1* | 6/2004 | Suzuki | 318/254 |
| 2004/0232865 A1* | 11/2004 | Suzuki | 318/439 |
| 2005/0280383 A1* | 12/2005 | Kifuku | 318/432 |
| 2005/0285555 A1* | 12/2005 | Chen et al. | 318/432 |
| 2005/0285556 A1* | 12/2005 | Chen et al. | 318/432 |
| 2006/0043917 A1* | 3/2006 | Kifuku et al. | 318/432 |
| 2006/0049792 A1* | 3/2006 | Chen et al. | 318/716 |

* cited by examiner under a high load is abruptly changed. For example, in a power steering apparatus, if a tire of a vehicle, which is driven by a motor, hits an obstacle on the road and is suddenly stopped, the back electromotive force generated by the rotation of the motor rapidly disappears. Accordingly, over voltage is applied by the excessive current deviation accumulated value and causes overcurrent abnormality. When the rotating direction of the motor that has been rotating under a high load is abruptly reversed or when the motor is decelerated, the motor is controlled to rotate in a direction to reduce the current deviation accumulated value (in the same direction as the previous rotating direction) until the current deviation accumulated value returns to a proper value. This causes delay in the response.

APPARATUS AND METHOD FOR CONTROLLING MOTOR

CROSS-REFERENCE TO RELATED APPLICATIONS

This application is based upon and claims the benefit of priority from prior Japanese Patent Application No. 2003-144321, filed on May 22, 2003, the entire contents of which are incorporated herein by reference.

BACKGROUND OF THE INVENTION

The present invention relates to an apparatus and a method for controlling a motor by computing a voltage command value based on at least a current deviation accumulated value.

A motor control apparatus for controlling motors such as a brushless motor, a brush DC motor, and an induction motor receives a current command value from a host controller in every control cycle performed at predetermined intervals (for example, at every 1 ms). The motor control apparatus computes a voltage command value based on the received current command value. The motor control apparatus then generates driving voltage corresponding to the computed voltage command value and supplies the driving voltage to a coil of the motor. In such motor control apparatuses, the actual current value flowing through the coil of the motor is detected by a current sensor. The motor control apparatus calculates the current deviation between the actual current value and the received current command value, and calculates the voltage command value by performing a predetermined computing process on at least the accumulated value of the current deviation (current deviation accumulated value). The voltage command value calculated as described above is sent to a pulse width modulation (PWM) control section. The PWM control section generates a PWM pulse by switching direct current supplied from a direct-current power source by a switching element of an inverter circuit and sends the PWM pulse to the motor.

To facilitate the control, in a three-phase DC motor, a current command that is subjected to a three-phase to two-phase conversion is sent to the motor control apparatus, and an inverse transformation (two-phase to three-phase conversion) is performed when determining a PWM pattern.

In the conventional motor control apparatus, the current deviation between the actual current value and the current command value is accumulated in every control cycle. The voltage command value is calculated based on at least the accumulated value (current deviation accumulated value). However, the voltage that can be supplied to the motor by a PWM pulse is limited due to the configuration of the inverter circuit.

That is, the voltage that can be supplied to the motor coil from the inverter circuit in a moment is either the voltage supplied from the direct-current power source (on) or 0V (off). Therefore, the switching element adjusts the on-time and the off-time in one control cycle by the switching operation such that the target output voltage is generated as a whole. Furthermore, the voltage to be output needs to be adjusted by the phase of the motor current to supply substantially sinusoidal current to the motor coil.

On the other hand, a wind-up phenomenon is caused in which the current deviation accumulated value increases in accordance with the load and operating state of the motor regardless of the voltage that can be supplied to the motor (average voltage of the PWM pulse). This causes a problem in the control when the motor is suddenly stopped or when the rotating direction of the motor that has been rotating When the voltage supplied to the inverter is decreased, the voltage command value exceeds the range of voltage that can be output by the inverter. Therefore, a sinusoidal current cannot be supplied, which causes torque ripple in the motor. This undesirably causes vibration and noise in the motor.

SUMMARY OF THE INVENTION

Accordingly, it is an objective of the present invention to provide a motor control apparatus that does not cause abnormalities when, for example, the motor is suddenly stopped or the rotating direction of the motor is reversed, or when the voltage supplied to the inverter is decreased, and therefore has reduced response delay, torque ripple, vibration, and noise.

To achieve the foregoing and other objectives and in accordance with the purpose of the present invention, a motor control apparatus is provided. The motor control apparatus includes a direct-current power source, which outputs a direct-current power source voltage, and an inverter circuit, which outputs a pulse voltage generated from the power source voltage to a motor. The motor control apparatus receives a current command value in every control cycle, calculates a current deviation accumulated value by accumulating the current deviation between the current command value and an actual current value that flows through a coil of the motor, computes a voltage command value in accordance with at least the current deviation accumulated value, and controls the inverter circuit based on the voltage command value. The motor control apparatus also judges whether the computed voltage command value is saturated exceeding a range of voltage that can be output from the inverter circuit, and restricts the accumulation of the current deviation when the voltage command value is judged to be saturated.

The present invention also provides a method for controlling a motor. A current command value is received in every control cycle, and a current deviation accumulated value is computed by accumulating the current deviation between the current command value and an actual current value that flows through a coil of the motor. A voltage command value is computed in accordance with at least the current deviation accumulated value. A pulse voltage, which is generated by switching a direct-current power source voltage by a switching element of an inverter circuit based on the computed voltage command value, is output to the motor. The method includes: judging whether the computed voltage command value causes a voltage saturation exceeding a range of the voltage that can be output from the inverter circuit; and restricting the accumulation of the current deviation of the current deviation accumulated value when the voltage command value is judged to be saturated.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A control apparatus of a brushless three-phase DC motor according to a first embodiment of the present invention will now be described with reference to FIGS. 1 to 6.

Figure 1:
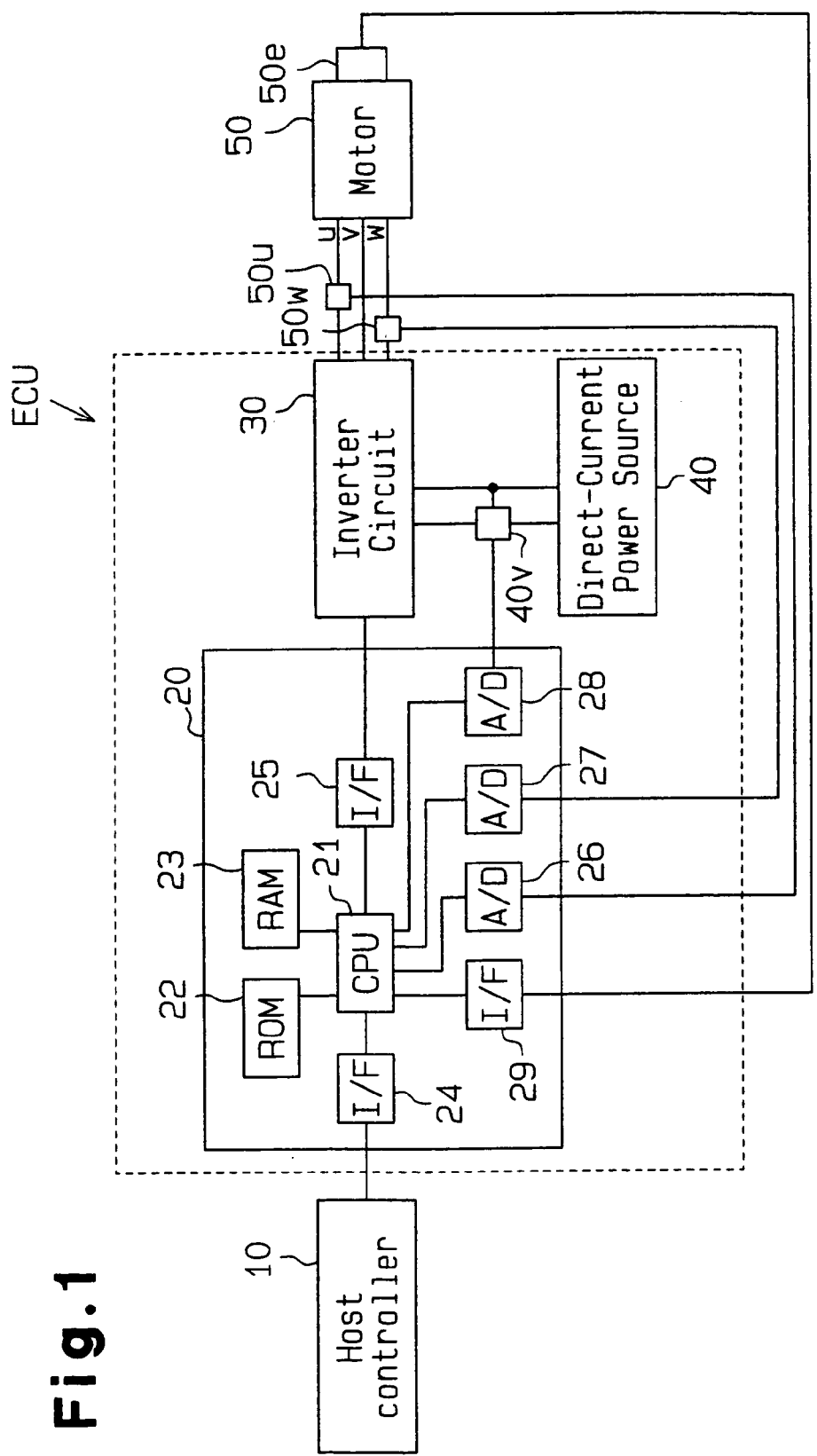
FIG. 1 is a block diagram illustrating a motor control system according to a first embodiment of the present invention.

FIG. 1 is a schematic diagram of a motor control system. An host controller 10 sends a command value to a control unit 20 of a control apparatus ECU, or to control means. The command value represents current to be supplied to a brushless three-phase DC motor, which is a motor 50. The control unit 20 computes a voltage command value based on the received current command value and determines a pulse-width-modulation (PWM) output pattern of each phase U, V, or W by a pulse-width-modulation (PWM) control. The PWM output patterns are sent to an inverter circuit 30. The inverter circuit 30 is supplied with direct-current power source voltage Vb from a direct-current power source 40. The power source voltage Vb is detectable by detecting means, which is a voltage sensor 40v. The inverter circuit 30 generates PWM pulses by switching power source voltage in accordance with the PWM output patterns. The inverter circuit 30 then supplies the PWM pulses to the motor 50. The actual current Iu of the phase U is detected by a current sensor 50u and the actual current Iw of the phase W is detected by a current sensor 50w as analog signals and fed back to the control unit 20. The current sensors 50u and 50w are, for example, hall current transformers (CT). The actual current Iv of the phase V is computed by the control unit 20 based on the actual current Iu of the phase U and the actual current Iw of the phase W. The motor 50 includes an encoder 50e, which detects the rotational angle of a rotor of the motor 50. The data of the rotational angle of the rotor is fed back to the host controller 10 via the control unit 20.

The control unit 20 is constituted by a central processing unit 21, a ROM 22, which stores programs to be executed by the CPU 21, a RAM 23, which stores information required for executing the programs, and peripheral circuits. The peripheral circuits include an interface circuit I/F 24, which is connected to the host controller 10, an interface circuit I/F 25, which is connected to the inverter circuit 30, an interface circuit I/F 29, which is connected to the encoder 50e, and several A/D converters 26, 27, 28. The A/D converters include the A/D converters 26, 27 for converting the analog signals from the current sensors 50u, 50w to digital signals and the A/D converter 28 for converting analog signals from the current sensor 40v to digital signals.

Figure 2:
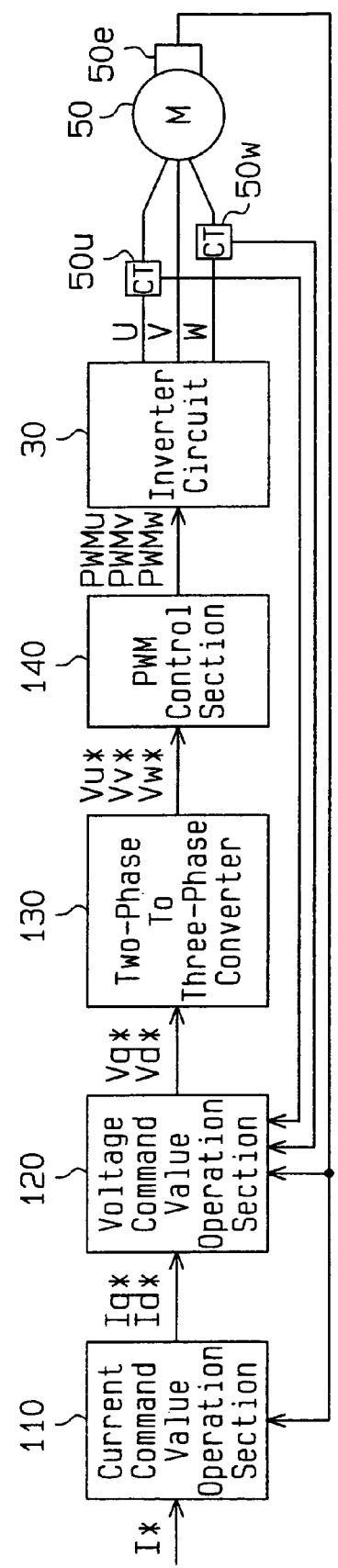
FIG. 2 is a block diagram illustrating a function of the motor control system.

FIG. 2 is a block diagram showing the structure and the flow of data focusing on the function of the motor control system. A current command value operation section 110 is a function of the host controller 10. The current command value operation section 110 executes a three-phase to two-phase conversion based on a current command value I* sent from other control apparatus, which is not shown, and the rotational angle of the rotor obtained from the encoder 50e. The current command value operation section 110 computes a d-axis current command value Id* and a q-axis current command value Iq*. The d-axis current command value Id* and the q-axis current command value Iq* are current command values representing the current to be supplied to a stator coil of the motor 50. A rotational coordinate system, which is synchronized with a magnetic flux generated by a permanent magnet on the rotor, has a d-axis and a q-axis. The d-axis lies in the same direction as the magnetic flux and the q-axis is perpendicular to the d-axis. The d-axis current command value Id* is the current of the d-axis component, and the q-axis current command value Iq* is the current of the q-axis component. In other words, the current command value of the d-axis component is Id*, and the current command value of the q-axis component is Iq*. The current command values Id*, Iq* are sent to voltage command value operation means, which is a voltage command value operation section 120.

The d-axis actual current Id and the q-axis actual current Iq are obtained by a three-phase to two-phase conversion from the actual current of each phase U, V, W obtained based on the output from the current sensors. The voltage command value operation section 120 computes a d-axis voltage command value Vd*, which is a d-axis component, and a q-axis voltage command value Vq*, which is a q-axis component, based on the d-axis current command value Id*, the q-axis current command value Iq*, the d-axis actual current Id, and the q-axis actual current Iq. The d-axis voltage command value Vd* and the q-axis voltage command value Vq* are converted to a U-phase voltage command value Vu*, a V-phase voltage command value Vv*, and a W-phase voltage command value Vw* by a two-phase to three-phase converter 130 using a known computing method.

The U-phase voltage command value Vu*, the V-phase voltage command value Vv*, and the W-phase voltage command value Vw* are sent to a PWM control section 140. The PWM control section 140 computes on-time and off-time of a switching element of each phase U, V, W in the inverter circuit 30 within one control cycle based on the voltage command value Vu*, Vv*, or Vw* of each phase. Based on the computed result, the PWM control section 140 generates switching control signals PWMu, PWMv, and PWMw and sends the signals to the inverter circuit 30. The inverter circuit 30 switches each switching element in accordance with the corresponding switching control signal PWMu, PWMv, or PWMw, and sends the generated PWM pulse to the motor 50.

The voltage command value operation section 120, the two-phase to three-phase converter 130, and the PWM control section 140 are functions of the control unit 20.

The voltage command value operation section 120 is the characteristics of the motor control system according to the first embodiment constituted as described above. The process performed by the voltage command value operation section 120 will now be described with reference to flowcharts of FIGS. 3 and 4. The processes performed by the two-phase to three-phase converter 130 and the PWM control section 140 are described with reference to a flowchart of FIG. 6. The flowcharts (control programs) of FIGS. 3 to 6 are repeated once every predetermined control cycle.

Figure 3:
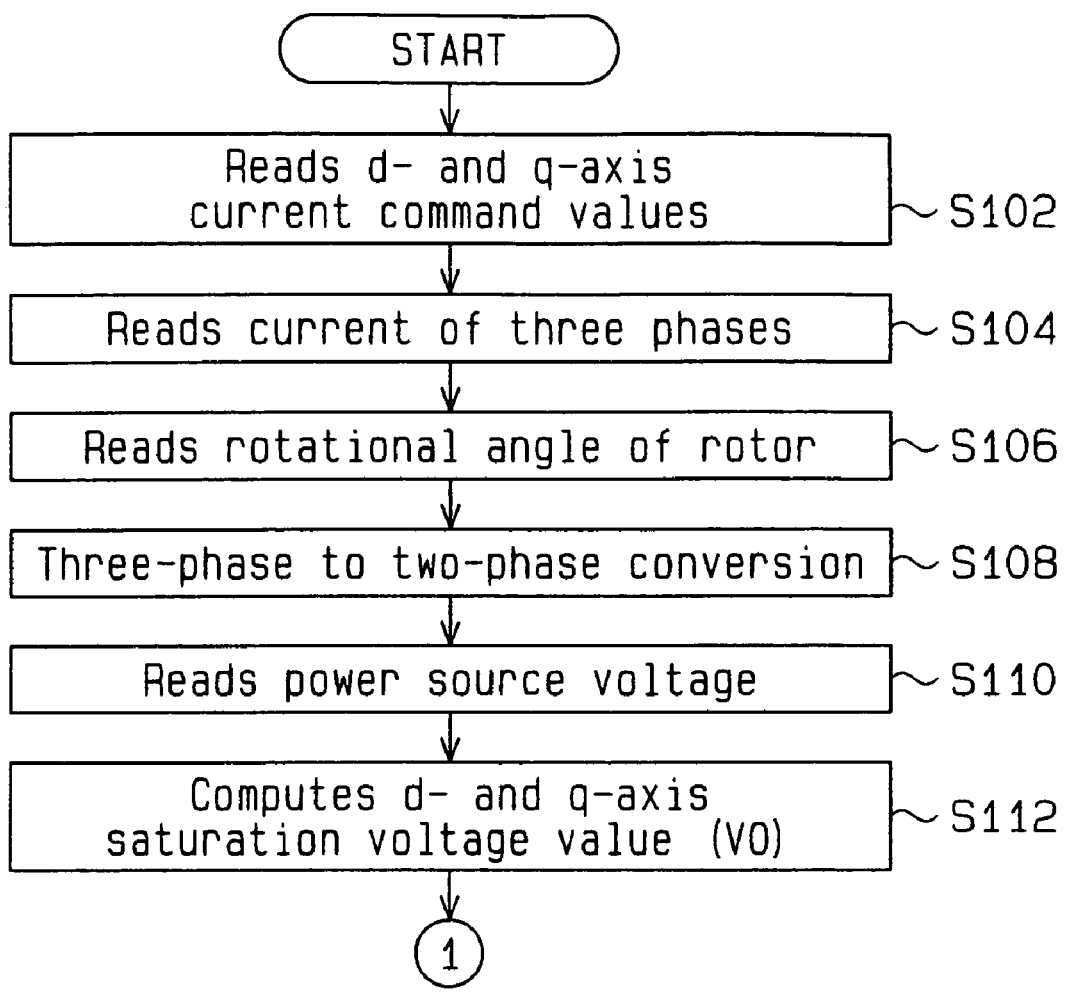
FIG. 3 is a flowchart showing a routine of a control unit.

FIG. 3 is a flowchart of a process performed before the d-axis voltage command value Vd* and the q-axis voltage command value Vq* are obtained. In step S102, the CPU 21 reads the d-axis current command value Id* and the q-axis current command value Iq* from the host controller 10 via the interface circuit I/F 24. In step S104, the CPU 21 reads the U-phase actual current Iu and the W-phase actual current Iw from the current sensors 50$u$, 50$w$ via the A/D converters 26, 27, respectively, and computes the V-phase actual current Iv. In step S106, the CPU 21 reads the rotational angle of the rotor from the encoder 50$e$ via the interface circuit I/F 29. In step S108, the CPU 21 performs a three-phase to two-phase conversion on the U-phase actual current Iu, the V-phase actual current Iv, and the W-phase actual current Iw based on the rotational angle of the rotor to obtain the d-axis actual current Id and the q-axis actual current Iq. In step S110, the CPU 21 reads the power source voltage Vb from the voltage sensor 40$v$ via the A/D converter 28. In step S112, the CPU 21 computes the maximum value (hereinafter, referred to as the accumulated maximum value VO) of voltage that can be output from the inverter circuit 30 in the d-axis and q-axis directions of the motor based on the power source voltage Vb. The accumulated maximum value VO corresponds to a voltage limit value.

More specifically, the accumulated maximum value VO is calculated using the following equation (1), which is a known arithmetic expression.

$$VO = Vb/2 \times (3/2)^{1/2} \times k \qquad (1)$$

In this equation, k represents the maximum voltage utilization factor of the inverter circuit 30 and is a constant number indicating the utilization factor corresponding to the limit of the duty of the inverter circuit 30. The power source voltage Vb and the utilization factor k correspond to physical quantities associated with the inverter circuit 30.

Figure 4:
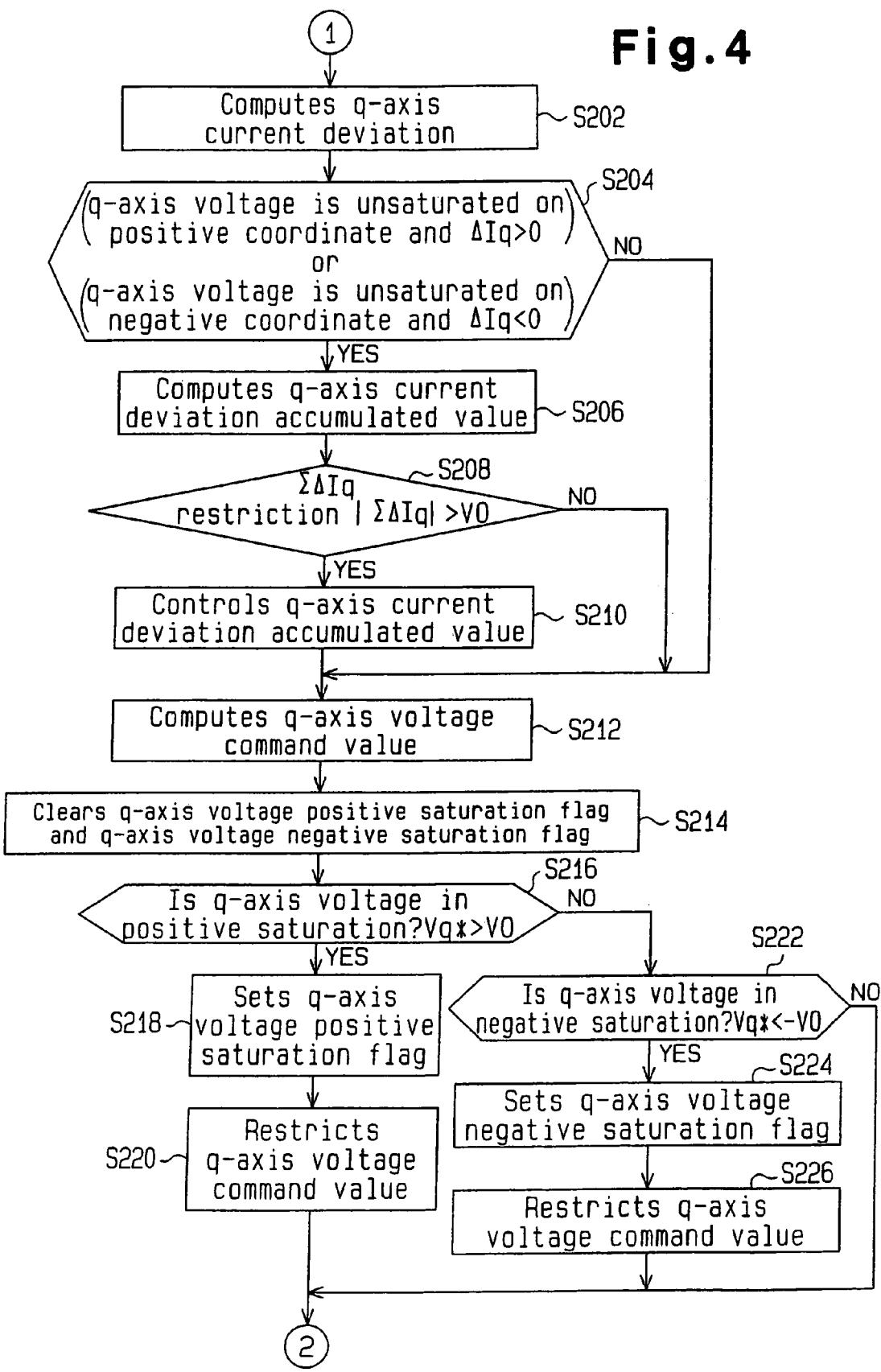
FIG. 4 is a flowchart showing the routine of the control unit.

FIG. 4 is a flowchart of a routine for computing the voltage command value of the q-axis. In step S202, the CPU 21 computes a q-axis current deviation ΔIq using the following equation (2).

$$\Delta Iq = Iq^* - Iq \qquad (2)$$

In step S204, the CPU 21 determines whether the q-axis voltage is unsaturated on a positive coordinate and the q-axis current deviation ΔIq is a positive value, or the q-axis voltage is unsaturated on a negative coordinate and the q-axis current deviation ΔIq is a negative value. If the decision outcome of step S204 is positive, the CPU 21 performs steps S206 to S210. If the decision outcome of step S204 is negative, the CPU 21 skips steps S206 to S210 and proceeds to step S212. Whether the q-axis voltages is saturated on the positive coordinate and the negative coordinate is determined in accordance with a q-axis voltage positive saturation flag and a q-axis voltage negative saturation flag set in step S218 or S224.

In step S206, the CPU 21 computes a q-axis current deviation accumulated value ΣΔIq (present value) using the following equation.

$$\Sigma \Delta Iq \text{ (present value)} = \Sigma \Delta Iq \text{ (previous value)} + \Delta Iq \times Giq \times T \qquad (3)$$

In this equation, Giq represents a q-axis current deviation integral gain and T represents a control cycle. In step S208, the CPU 21 determines whether the absolute value of the q-axis current deviation accumulated value ΣΔIq exceeds the accumulated maximum value VO, which is a guard value. If the decision outcome of step S208 is positive, that is, if it is determined that the absolute value of the q-axis current deviation accumulated value ΣΔIq exceeds the accumulated maximum value VO, the CPU 21 proceeds to step S210. In step S210, the CPU 21 controls the absolute value of the q-axis current deviation accumulated value ΣΔIq to become less than or equal to the accumulated maximum value VO, which is the guard value. More specifically, the CPU 21 performs the computation according to the following equation.

$$\Sigma \Delta Iq = \text{sign}(\Sigma \Delta Iq) \times VO \qquad (4)$$

In this equation, sign is a function for performing a sign judgment, and sign(ΣΔIq) represents "+1" or "−1" in accordance with the judgment result.

In step S212, the CPU 21 computes the q-axis voltage command value Vq* using the following equation (5).

$$Vq^* = \Delta Iq \times Gpq + \Sigma \Delta Iq \qquad (5)$$

In this equation, Gpq represents a q-axis current deviation proportional gain. In a case where the CPU 21 has proceeded to step S212 from step S204, the CPU 21 uses the previous value (the value computed in the previous control cycle) of the q-axis current deviation accumulated value ΣΔIq.

In step S214, the CPU 21 clears the q-axis voltage positive saturation flag and the q-axis voltage negative saturation flag. In step S216, the CPU 21 determines whether the q-axis voltage command value Vq* computed in step S212 is in positive voltage saturation, that is, whether the q-axis voltage command value Vq* is greater than the accumulated maximum value VO (Vq*>VO). If the decision outcome of step S216 is positive, the CPU 21 performs steps S218 and S220. If the decision outcome of step S216 is negative, the CPU 21 proceeds to step S222.

In step S218, the CPU 21 sets the q-axis voltage positive saturation flag. The q-axis voltage positive saturation flag is referenced in step S204 of the subsequent control cycle. In step S220, the CPU restricts the q-axis voltage command value Vq* to a value less than or equal to the accumulated maximum value VO. Since step S220 is executed when the q-axis voltage command value Vq* is in positive saturation, the q-axis voltage command value Vq* is controlled to be less than or equal to the accumulated maximum value VO by making the q-axis voltage command value Vq* equal to the accumulated maximum value VO (Vq*=VO). In steps S208 and S210, the absolute value of the q-axis current deviation accumulated value ΣΔIq is restricted to be less than or equal to the accumulated maximum value VO. However, since the q-axis voltage command value Vq* is obtained by adding $\Delta Iq \times Gpq$ to the q-axis current deviation accumulated value $\Sigma\Delta Iq$ in step S212, the absolute value of the q-axis voltage command value Vq* might exceeds the accumulated maximum value VO. In such cases also, step S220 is prevents the absolute value of the q-axis voltage command value Vq* from exceeding the accumulated maximum value VO. After step S220, the CPU 21 proceeds to step S302 of the flowchart in FIG. 5.

In step S222, the CPU 21 determines whether the q-axis voltage command value is in negative voltage saturation, that is, whether the q-axis voltage command value Vq* is smaller than the negative accumulated maximum value VO (Vq*<−VO). If the decision outcome of step S222 is positive, the CPU 21 performs steps S224 and S226. In step S224, the CPU sets the q-axis voltage negative saturation flag. The q-axis voltage negative saturation flag is referenced in step S204 of the subsequent control cycle in the same manner as the q-axis voltage positive saturation flag. In step S226, the CPU 21 restricts the q-axis voltage command value Vq* as in step S220. That is, the CPU 21 controls the q-axis voltage command value Vq* to be equal to the negative accumulated maximum value VO (Vq*=−VO), and proceeds to step S302 of the flowchart in FIG. 5.

If the decision outcome of step S222 is negative, the CPU 21 proceeds to step S302.

Figure 5:
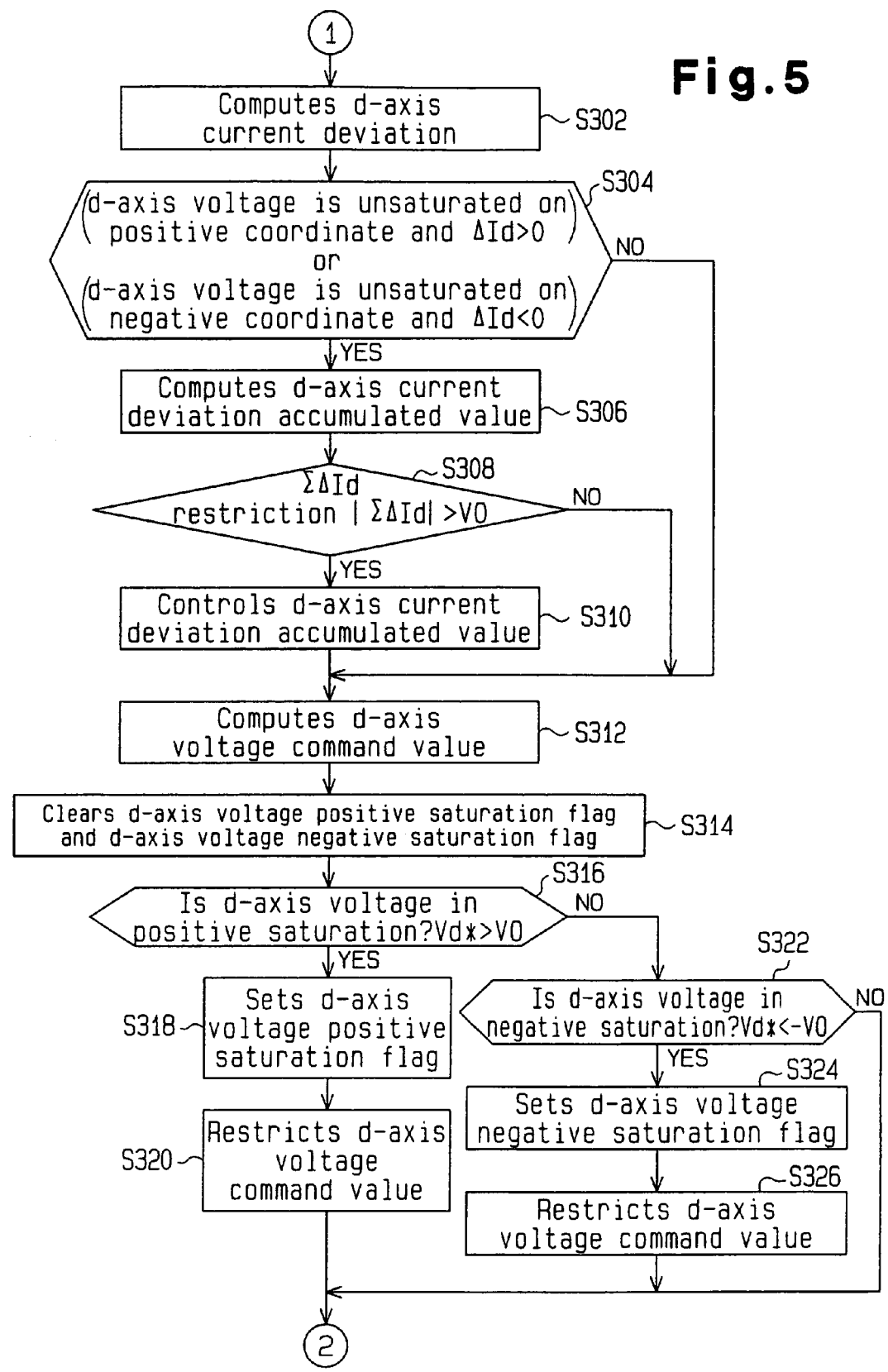
FIG. 5 is a flowchart showing the routine of the control unit.

When the routine of the flowchart in FIG. 4 is completed, the CPU 21 executes the routine of the flowchart in FIG. 5, which is a flowchart for computing the d-axis voltage command value Vd*. Since the d-axis voltage command value Vd* is obtained in the same manner as the q-axis voltage command value Vq*, the detailed explanations are omitted.

In other words, in the above description for the flowchart in FIG. 4, q is substituted by d to make sufficient description for the flowchart in FIG. 5. Thus, detailed explanations are omitted. In the steps of FIG. 5 corresponding to the steps S202 to S226 of FIG. 4, the numbers in hundred's places are substituted by 3 and the same numerals are given for the last two digits.

In FIG. 5, $\Delta Id$ represents a d-axis current deviation and $\Sigma\Delta Id$ represents a d-axis current deviation accumulated value.

The process performed by the two-phase to three-phase converter 130 and the PWM control section 140 is described with reference to the flowchart of FIG. 6.

Figure 6:
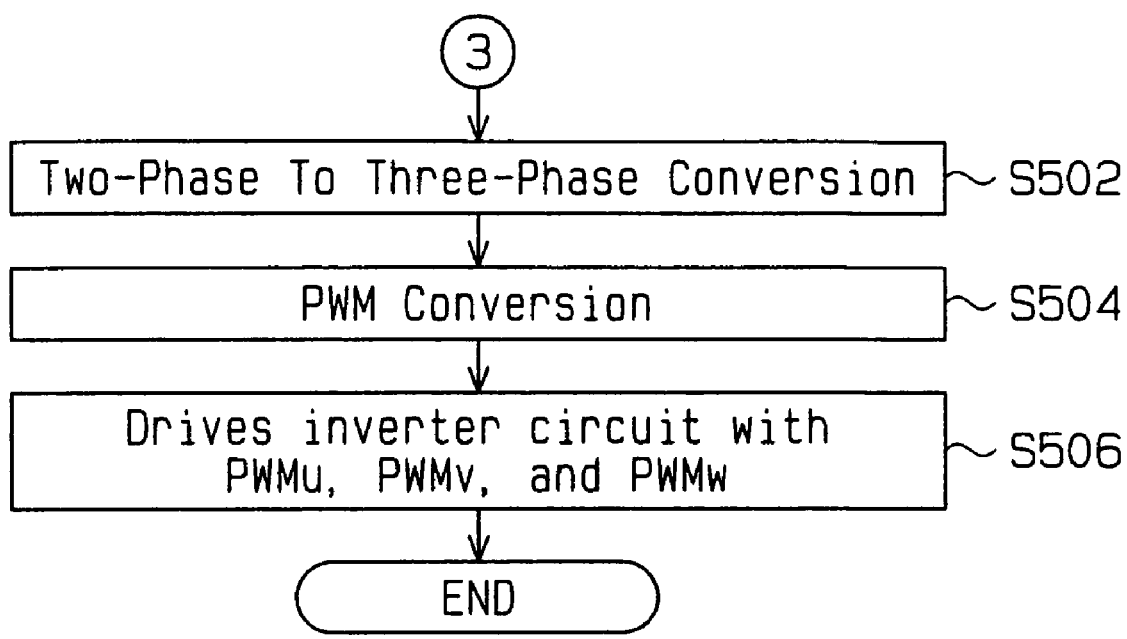
FIG. 6 is a flowchart showing the routine of the control unit.

FIG. 6 is a flowchart showing a routine for calculating the switching control signals PWMu, PWMv, and PWMw to be sent to the inverter circuit 30 based on the q-axis voltage command value Vq* and the d-axis voltage command value Vd* by a known procedure. In step S502, the q-axis voltage command value Vq* and the d-axis voltage command value Vd* are subjected to the two-phase to three-phase conversion to obtain the U-phase voltage command value Vu*, the V-phase voltage command value Vv*, and the W-phase voltage command value Vw*. In step S504, the voltage command values Vu*, Vv*, and Vw* are subjected to PWM conversion to obtain the switching control signals PWMu, PWMv, and PWMw. In step S506, the switching control signals PWMu, PWMv, and PWMw are sent to the inverter circuit 30 to drive the inverter circuit 30.

As described above, the inverter circuit 30 is driven in accordance with the d-axis current command value Id* and the q-axis current command value Iq* from the host controller 10. Accordingly, the PWM controlled pulse voltage (PWM signal) is supplied to the motor 50.

The CPU 21 corresponds to voltage limit value setting means, voltage command value computing means, and voltage saturation judging means. The process performed by the voltage limit value setting means corresponds to step S112 in FIG. 3. The process performed by the voltage command value computing means corresponds to steps S202 to S212 in FIG. 4 and steps S302 to S312 in FIG. 5. The CPU 21 also corresponds to the voltage saturation judging means. The process performed by the voltage saturation judging means corresponds to steps S214 to S218 and steps S222 to S224 in FIG. 4 and steps S314 to S318 and steps S322 to S324 in FIG. 5.

The control apparatus according to the first embodiment provides the following advantages.

(1) The CPU 21 of the motor control apparatus of the first embodiment judges whether the computed d-axis voltage command value Vd* and the q-axis voltage command value Vq* (voltage command values) exceed the range of voltage that can be output from the inverter circuit 30 and cause voltage saturation. When it is determined that voltage saturation is caused, the CPU 21 (voltage command value computing means) restricts the accumulation of the current deviation of the current deviation accumulated value. In the motor control method, the voltage saturation is judged and the accumulation of the current deviation of the current deviation accumulated value is restricted.

As a result, in the first embodiment, since the q-axis current deviation accumulated value $\Sigma\Delta Iq$ and the d-axis current deviation accumulated value $\Sigma\Delta Id$ are restricted to be less than or equal to the accumulated maximum value VO, the current deviation accumulated value is prevented from increasing beyond the capacity of the direct-current power source 40 and the inverter circuit 30. This prevents a wind-up phenomenon. Accordingly, abnormalities such as overcurrent are prevented from occurring when the motor 50 is suddenly stopped. The delay in the response is also reduced when the rotating direction of the motor 50 is suddenly reversed or rapidly decelerated.

(2) Based on the comparison result of the q-axis voltage command value Vq* computed in step S212 of FIG. 4 and the d-axis voltage command value Vd* computed in step S312 of FIG. 5 with the accumulated maximum value VO, which is the voltage limit value, the CPU 21 sets a flag representing a voltage saturation. The CPU 21 then determines whether to accumulate the current deviation in the subsequent control cycle in accordance with this flag. Therefore, the current deviation accumulated value is reliably restricted to a value less than or equal to the accumulated maximum value VO through a simple process. As a result, since a short control cycle is achieved without putting burden on the CPU 21, the motor 50 is accurately controlled.

(3) The power source voltage Vb of the direct-current power source 40 is read by the voltage sensor 40v in every control cycle (in step S110 of FIG. 3). The CPU 21 computes the accumulated maximum value VO based on the power source voltage Vb (in step S112 of FIG. 3). Therefore, the current deviation accumulated value is optimally controlled even if the power source voltage Vb fluctuates.

(4) According to the first embodiment, the CPU 21 (voltage saturation judging means) compares the voltage command value of each of two orthogonal axes (d-axis, q-axis) of the rotational coordinate system with the accumulated maximum value VO, which is the voltage limit value for the voltage saturation judgment. If it is determined that the voltage command value is greater than the accumulated maximum value VO, the CPU 21 determines that the voltage saturation is caused. The accumulated maximum value VO is the maximum value of the voltage that can be output from the inverter circuit 30 to the motor 50 in the directions of two orthogonal axes.

As a result, the d-axis voltage command value Vd* and the q-axis voltage command value Vq* are maintained to be less than or equal to the accumulated maximum value VO in the direction of the two orthogonal axes. Accordingly, the above mentioned advantage (1) is easily achieved.

(5) According to the first embodiment, the CPU 21 judges whether the voltage command value of each axis is in voltage saturation in steps S214 to S218, steps S222 to S224, steps S314 to 318, and steps S322 to S324. When it is determined that the voltage saturation is caused, the CPU 21 stops accumulation of the current deviation that further increases the current deviation accumulated value of each axis in the subsequent control cycle if the q-axis current deviation accumulated value $\Sigma\Delta Iq$ and the d-axis current deviation accumulated value $\Sigma\Delta Id$ have the same sign as the q-axis current deviation $\Delta Iq$ and the d-axis current deviation $\Delta Id$, respectively, in step S204 or S304.

As a result, the advantage (1) is easily achieved.

A second embodiment of the present invention will now be described with reference to FIG. 7. The second embodiment has the same structure as the first embodiment except that the second embodiment includes a booster circuit 41 and a booster circuit control section 42. The booster circuit 41 boosts the power source voltage output from the direct-current power source 40, and then outputs the boosted voltage to the inverter circuit 30. The booster circuit control section 42 controls the booster circuit 41. The booster circuit 41 and the booster circuit control section 42 will only be described below. Like or the same reference numerals are given to the components that are like or the same as the corresponding components of the first embodiment and detailed explanations are omitted.

Figure 7:
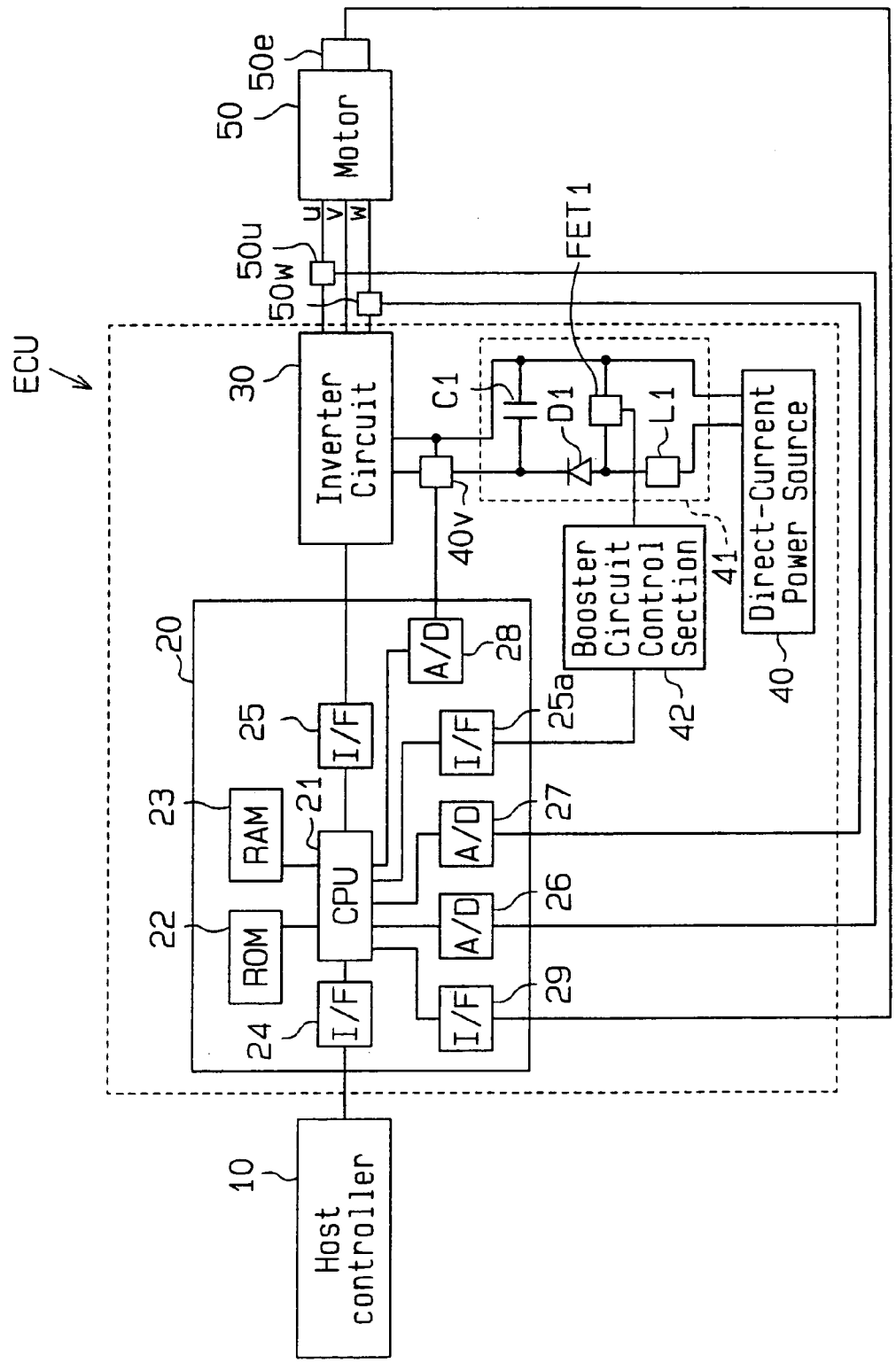
FIG. 7 is a schematic diagram illustrating a motor control system according to a second embodiment.

As shown in FIG. 7, the booster circuit 41 is located between the direct-current power source 40 and the inverter circuit 30. The booster circuit 41 is provided with the booster circuit control section 42, which controls the booster circuit 41. The booster circuit control section 42 is connected to the CPU 21 via the interface circuit I/F 25a of the control unit 20.

The booster circuit 41 boosts the voltage output from the direct-current power source 40, and outputs the boosted voltage to the inverter circuit 30. The booster circuit 41 is formed by a coil L1, a field effect transistor FET1, a diode D1, and a capacitor C1. The booster circuit control section 42 controls on and off of the field effect transistor FET1. Changing the on-time and off-time of the field effect transistor FET1 varies the power source voltage Vb. The booster circuit control section 42 adjusts the on-time and off-time of the field effect transistor FET1 in accordance with the instruction from the CPU 21. In other words, the power source voltage Vb that corresponds to the instruction of the CPU 21 is output from the booster circuit 41 to the inverter circuit 30.

The operations and advantages of the second embodiment constituted as described above will now be described. If the voltage output from the direct-current power source 40 is sufficient for the load required on the motor 50, there is no problem even in the case with the first embodiment. However, in a case where a battery (DC12V/DC24V) of a vehicle is used as the direct-current power source 40 to drive the motor 50 for assisting a power steering of the vehicle, the voltage supplied to the motor 50 is insufficient and current cannot be supplied to the motor 50. Therefore, necessary motor output (torque and number of rotations) cannot be obtained. In such cases, the number of turns of the motor coil needs to be increased to guarantee the necessary motor output. This undesirably increases the weight and the cost of the motor 5.

The second embodiment solves this problem by boosting the power source voltage Vb supplied to the inverter circuit 30 by the booster circuit 41 so that the voltage supplied to the motor 50 is increased. In other words, when the load applied to the motor 50 is great and the voltage output from the direct-current power source 40 is insufficient to generate the motor output necessary for driving the load, the CPU 21 instructs the booster 41 to boost the power source voltage Vb to a value corresponding to the load amount on the motor 50. Accordingly, the motor 50 provides the necessary motor output.

A target value of the output voltage of the booster circuit 41 may be obtained with reference to a table, which is made by calculating the voltage value required for each stage of the load amount on the motor 50 and stored, for example, in the ROM 22. The target value may also be computed in every control cycle based on the load amount on the motor 50. Alternatively, since the load amount on the motor 50 is substantially proportional to the rate of the on-time (positive voltage output time) of the switching element of the inverter circuit 30 in one control cycle, the load amount may be estimated based on this rate to obtain the target value of the output voltage of the booster circuit 41. The load amount of the motor 50 can be detected in accordance with the U, V, and W-phase actual current values, or the d-axis actual current Id and the q-axis actual current Iq.

When the load applied to the motor 50 is small and the voltage output by the direct-current power source 40 is sufficient to generate the motor output necessary for driving the load, the booster circuit 41 does not boost the power source voltage Vb. Accordingly, the motor 50 is controlled with high accuracy. In other words, when the load on the motor 50 is small with respect to the power source voltage Vb, the switching frequency of the switching element of the inverter circuit 30 is decreased. This increases the influence of a higher harmonic on the current supplied to the coil of each phase of the motor 50. As a result, the current waveform of the motor coil does not describe a sinusoidal pattern, and the motor 50 cannot be controlled with high accuracy. In this case, the booster circuit 41 is kept from boosting the power source voltage Vb, and the switching element of the inverter circuit 30 is switched at an appropriate frequency so that the motor 50 is controlled with high accuracy.

Accordingly, the second embodiment provides the following advantage in addition to the advantages (1) to (3) of the first embodiment. The booster circuit 41 boosts the output voltage of the direct-current power source 40 before outputting the voltage to the inverter circuit 30. Accordingly, the motor 50 gives the motor output that is greater than the motor output obtained when the output voltage from the direct-current power source 40 is sent to the inverter circuit 30 without boosting. When boosting is not performed since sufficient motor output is obtained from the motor 50 without boosting the output voltage of the direct-current power source 40, the motor 50 is controlled with high accuracy.

A third embodiment will now be described with reference to FIGS. 8 to 11.

Since the structure of the hardware of the third embodiment is the same as that of the first embodiment, like or the same reference numerals are given to those components that are like or the same as the corresponding components of the first embodiment and detailed descriptions are omitted. Only the differences of the operations will mainly be discussed below.

Figure 8:
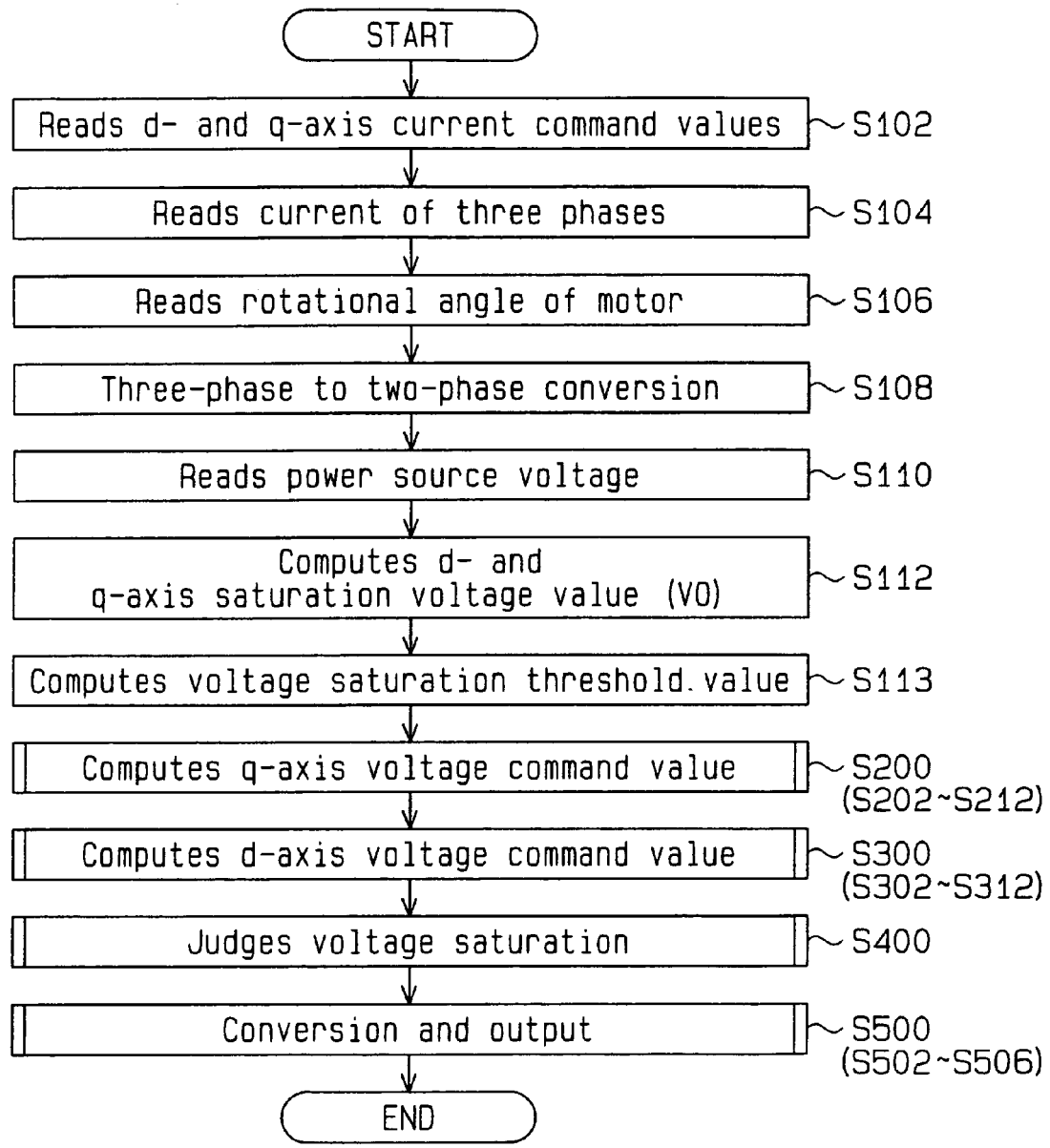
FIG. 8 is a flowchart showing a routine of a control unit according to a third embodiment.
Figure 9:
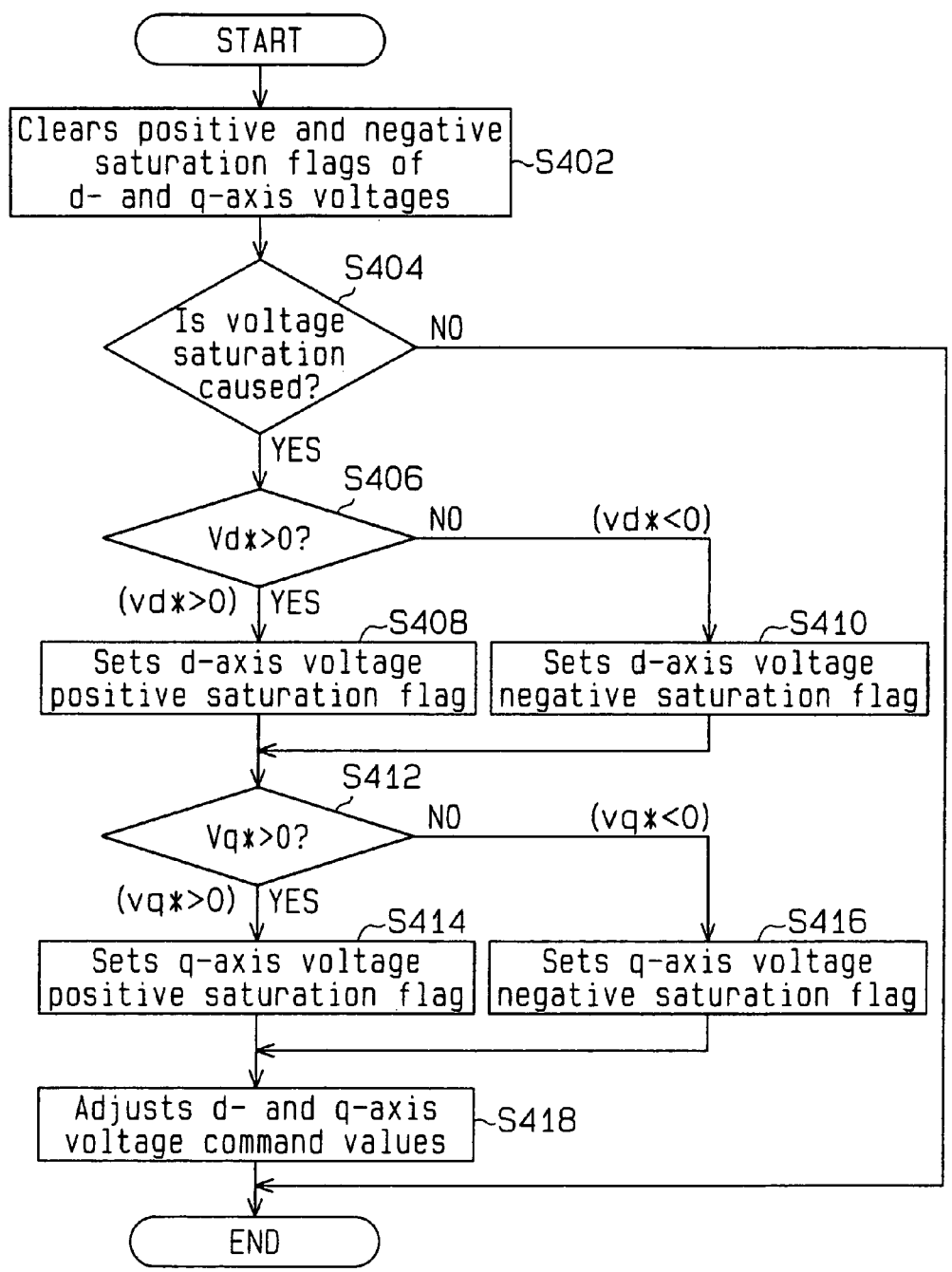
FIG. 9 is a flowchart showing the routine of the control unit.

FIGS. 8 and 9 are flowcharts of routines executed by the CPU 21 of the third embodiment. The routines are executed once every predetermined control cycle. In the flowcharts, steps S102 to S112, S202 to S212, S302 to S312, and S502 to S506 are the same as those steps in the flowcharts of the first embodiment. Therefore, the same step numbers are given and detailed explanations are omitted. Steps S202 to S212 are referred to as a q-axis voltage command value computing routine S200 and steps S302 to 312 are referred to as a d-axis voltage command value computing routine S300. Steps S502 to S506 are a sub-routine of a conversion and output routine S500.

Step S113 executed after step S112 is a process for computing a voltage saturation threshold value. The CPU 21 computes the voltage saturation threshold value Vmax in accordance with the following equation (6).

$$V\max = g(Vb) \qquad (6)$$
$$= (Vb/2) \times k$$

In this equation, k is a maximum voltage utilization factor of the inverter circuit 30 and is a constant number indicating the utilization factor corresponding to the limit of the duty of the inverter circuit 30. The voltage saturation threshold value Vmax corresponds to a voltage limit value and is the maximum value of the phase voltage that can be output from the inverter circuit 30. The power source voltage Vb and the utilization factor k correspond to physical quantities associated with the inverter circuit 30.

After step S113, the CPU 21 executes the q-axis voltage command value computing routine of step S200. After step S200, the CPU 21 executes the d-axis voltage command value computing routine of step S300. After step S300, the CPU 21 executes a voltage saturation judging routine of step S400.

FIG. 9 shows a flowchart of the voltage saturation judging routine of step S400.

In step S402, the CPU 21 clears the q-axis voltage positive saturation flag, the q-axis voltage negative saturation flag, the d-axis voltage positive saturation flag, and the d-axis voltage negative saturation flag. In step S404, the CPU 21 determines whether the voltage saturation is caused. More specifically, the CPU 21 determines whether a value obtained by combining the vectors of the q-axis voltage command value Vq* and the d-axis voltage command value Vd* satisfies the following conditions.

$$(2/3)^{1/2} \times (Vd^{*\wedge}2 + Vq^{*\wedge}2)^{1/2} \leq V\max \text{ (voltage saturation threshold value)} \qquad (7)$$

In this equation, each number preceded by "^" represents an exponent.

The equation (7) will now be described.

When the d-axis voltage command value is Vd* and the q-axis voltage command value is Vq*, the voltage command value of each phase after being subjected to the two-phase to three-phase conversion is as shown below.

$$Vu^* = (2/3)^{1/2} \times \{Vd^* \times \cos\theta - Vq^* \times \sin\theta\} \qquad (8)$$

$$Vv^* = (2/3)^{1/2} \times \{Vd^* \times \cos(\theta - 120°) - Vq^* \times \sin(\theta - 120°)\} \qquad (9)$$

$$Vw^* = (2/3)^{1/2} \times \{Vd^* \times \cos(\theta - 240°) - Vq^* \times \sin(\theta - 240°)\} \qquad (10)$$

Therefore, the amplitude of the voltage command value of each phase is as follows.

$$|\text{voltage command value of each phase}| = (2/3)^{1/2} \times (Vd^{*\wedge}2 + Vq^{*\wedge}2)^{1/2} \qquad (11)$$

In this equation, when the maximum voltage utilization factor that can be output from the inverter circuit 30 is β[%], the inverter circuit 30 can only output the voltage in the following range.

$$(-Vb/2) \times \beta/100 \text{ to } (Vb/2) \times \beta/100$$

Therefore, the phase voltage command value needs to satisfy the following inequality.

$$(2/3)^{1/2} \times (Vd^{*\wedge}2 + Vq^{*\wedge}2)^{1/2} \leq (Vb/2) \times \beta/100$$

If β/100 is equal to k (β/100=k), Vmax (voltage saturation threshold value) equals to (Vb/2) multiplied by β/100 ((Vmax (voltage saturation threshold value)=(Vb/2)×β/100).

Therefore, the relationship of the equation (7) is obtained.

If the condition is not satisfied, each phase voltage is saturated and the vicinity of the sinusoidal waveform peak is clamped. This hinders proper sinusoidal power supply, which results in the deformation of the current waveform.

Figure 10:
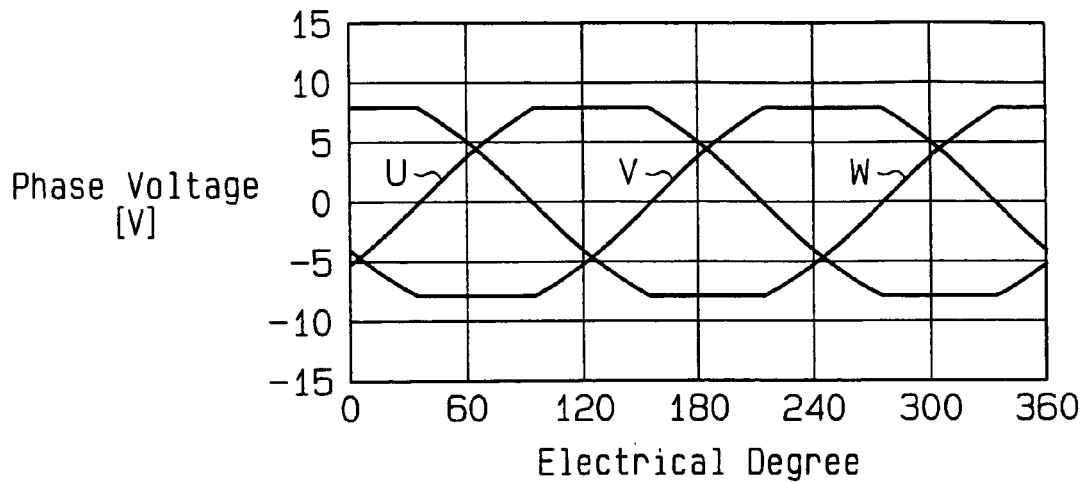
FIG. 10 is an explanatory diagram showing the clamped state of each phase voltage.
Figure 11:
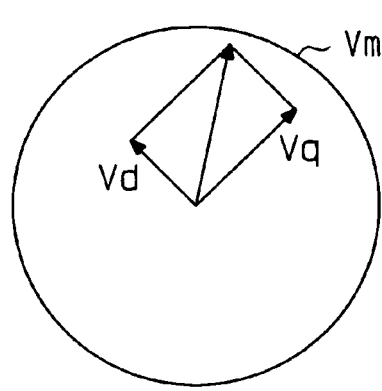
FIGS. 11(a) to 11(c) are explanatory diagrams showing the relationship between the value obtained by combining the vectors of the voltage command value of each axis and the voltage saturation threshold value Vmax.
Figure 11:
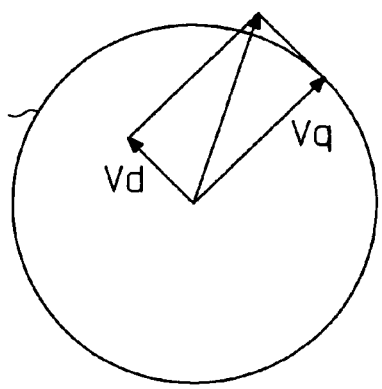
Figure 11:
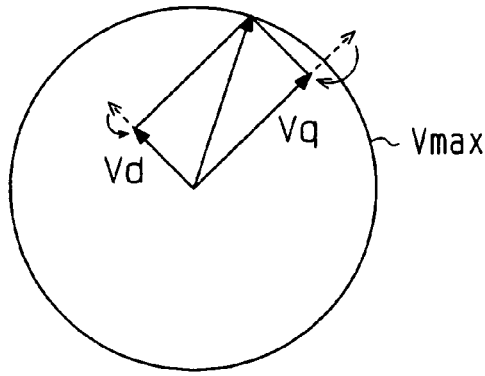

FIG. 10 is a diagram showing the phase voltage. FIG. 10 shows a phase voltage waveform when voltage saturation is caused and the peak is clamped. Lines U, V, and W each represent the voltage waveform of the corresponding phase.

The condition is often not satisfied in the electric power steering control apparatus when, for example, back electromotive force is great and a great amount of current is required when the steering wheel is rapidly turned. In such cases, since the d-axis voltage command value Vd* and the q-axis voltage command value Vq* are great, the phase voltage waveform is deformed. As a result, the phase current waveform is deformed and noise could be generated by the motor.

If it is determined that the value obtained by combining the vectors of the q-axis voltage command value Vq* and the d-axis voltage command value Vd* satisfies the equation (7), that is, if the decision outcome of step S404 is positive, the CPU 21 proceeds to step S406. If it is determined that the decision outcome of step S404 is negative, the CPU 21 terminates the routine and proceeds to step S500.

In step S406, the CPU 21 determines whether the sign of the d-axis voltage command value Vd* is positive. If the sign is positive, the CPU 21 proceeds to step S408 and then to S412. In steps S408 and S410, the CPU 21 sets the d-axis voltage positive saturation flag and the d-axis voltage negative saturation flag, respectively. The d-axis voltage positive saturation flag and the d-axis voltage negative saturation flag are referenced in step S304.

In step S412, the CPU 21 determines whether the sign of the q-axis voltage command value Vq* is positive. If the sign is positive, the CPU 21 proceeds to step S414 and then to S418. In steps S414 and S416, the CPU 21 sets the q-axis voltage positive saturation flag and the q-axis voltage negative saturation flag, respectively. The q-axis voltage positive saturation flag and the q-axis voltage negative saturation flag are referenced in step S204.

In step S418, the CPU 21 adjusts, or corrects, the d-axis voltage command value Vd* and the q-axis voltage command value Vq* such that the equation (7) is satisfied. More specifically, the correcting process includes correcting only the d-axis voltage command value Vd*, correcting only the q-axis voltage command value Vq*, and correcting both the d-axis voltage command value Vd* and the q-axis voltage command value Vq*. In step S418, the CPU 21 performs one of the correcting processes.

Each correcting process will be described below.

1) The process for correcting only the d-axis voltage command value Vd* is performed in accordance with the following computing equation (12).

$$Vd^* \text{ (after correction)} = \alpha 1 \times Vd^* \text{ (before correction)} \quad (12)$$

In this equation, $\alpha 1 = (3/2)^{1/2} \times (Vmax^2 - Vq^{*2})^{1/2} / Vd^*$ (before correction).

2) The process for correcting only the q-axis voltage command value Vq* is performed in accordance with the following computing equation (13).

$$Vq^* \text{ (after correction)} = \alpha 2 \times Vq^* \text{ (before correction)} \quad (13)$$

In this equation, $\alpha 2 = (3/2)^{1/2} \times (Vmax^2 - Vd^{*2})^{1/2} / Vq^*$ (before correction).

3) The process for correcting both the d-axis voltage command value Vd* and the q-axis voltage command value Vq* is performed in accordance with the following computing equations (14) and (15).

$$Vd^* \text{ (after correction)} = \alpha 3 \times Vd^* \text{ (before correction)} \quad (14)$$

$$Vq^* \text{ (after correction)} = \alpha 3 \times Vq^* \text{ (before correction)} \quad (15)$$

In these equations, $\alpha 3 = (3/2)^{1/2} \times (Vmax/(Vd^*(\text{before correction})^2 + Vq^*(\text{before correction})^2)^{1/2}$.

The process 1) for correcting only the d-axis voltage command value Vd* places emphasis on the torque. The process 2) for correcting only the q-axis voltage command value Vq* places emphasis on the speed. The process 3) for correcting both the d-axis voltage command value Vd* and the q-axis voltage command value Vq* keeps balance between the torque and the speed.

In the third embodiment, the process 3) for correcting both the d-axis voltage command value Vd* and the q-axis voltage command value Vq* is executed.

After step S418, the CPU 21 proceeds to step S500 in which the conversion and output routine is executed. Since the equation (7) is satisfied after the correction process in step S418, the value obtained by combining the vectors of the d-axis voltage command value Vd* and the q-axis voltage command value Vq* does not exceed the range of the voltage that can be output by the inverter circuit 30.

In the third embodiment, the CPU 21 corresponds to the voltage limit value setting means, the voltage command value computing means, the voltage saturation judging means, and correction means. Unlike the first embodiment, the process of step S113 in FIG. 8 corresponds to the process of the voltage limit value setting means. The process of steps S202 to S212 and S302 to S312 in FIG. 8 correspond to the process of the voltage command value computing means. Unlike the first embodiment, the process of steps S402 to S416 in FIG. 9 corresponds to the process of the voltage saturation judging means. The process of step S418 corresponds to the process of the correction means.

The third embodiment provides the following advantages in addition to the advantages (1) and (3) of the first embodiment.

(1) In the apparatus and method for controlling the motor according to the third embodiment, the voltage limit value corresponds to the voltage saturation threshold value Vmax. That is, the voltage limit value is set as the maximum phase voltage that can be output from the inverter circuit 30. The CPU 21 compares the value obtained by combining the vectors of the voltage command values of the two orthogonal axes of the rotational coordinate system, that is, the d-axis and q-axis voltage command values, with the voltage saturation threshold value Vmax, which is the voltage limit value. If the value obtained by combining the vectors is greater than the voltage saturation threshold value Vmax, the CPU 21 determines that the voltage saturation is caused.

In the third embodiment, unlike the first embodiment, the voltage saturation is not determined for each of d-axis and q-axis voltage command values in the axial directions of the two orthogonal axes. Instead, the voltage saturation is determined by whether the value obtained by combining the vectors exceeds the voltage limit value. This improves the accuracy of judgment.

(2) In the third embodiment, when it is determined that the voltage saturation is caused, the CPU 21 corrects the d-axis voltage command value Vd* and the q-axis voltage command value Vq* such that the computed value obtained by combining the vectors of the voltage command values of the two orthogonal axes does not exceed the voltage saturation threshold value Vmax, which is the range of the voltage that can be output by the inverter circuit 30.

When correction is not performed, for example, the state shown in FIG. 11(b) can be caused. In FIG. 11(b), the q-axis voltage command value Vq and the d-axis voltage command value Vd are within the accumulated maximum value VO. However, the value obtained by combining the vectors exceeds the voltage saturation threshold value Vmax. In this case, since the equation (7) is not satisfied, the peak of the waveform of each phase voltage is saturated and clamped when two-phase to three-phase conversion is performed. This hinders proper sinusoidal power supply and generates noise. In the third embodiment, however, the value obtained by combining the vectors is adjusted not to exceed the voltage saturation threshold value Vmax. This enables the sinusoidal power supply and reduces generation of torque ripple, vibration, noise, and the like.

In FIG. 11(a), the q-axis voltage command value Vq and the d-axis voltage command value Vd are within the accumulated maximum value VO and the value obtained by combining the vectors of the voltage command values of both axes is within the voltage saturation threshold value Vmax.

It should be apparent to those skilled in the art that the present invention may be embodied in many other specific forms without departing from the spirit or scope of the invention.

(1) In the illustrated embodiments, the cases for controlling the brushless three-phase DC motor are described. However, the brushless three-phase DC motor may be replaced with an induction motor or a brush DC motor. The invention may also be applied to a linear motor, which moves linearly.

(2) The brush DC motor may be controlled by setting the pulse width of the pulse voltage output from the inverter circuit 30 to the motor 50 to be constant, and adjusting the power source voltage Vb. In other words, the motor 50 may be controlled by pulse amplitude modulation (PAM) control, which is a pulse voltage amplitude control method.

(3) In the third embodiment, during the correction process of step S418 performed by the correcting means, the process 3) for correcting both the d-axis voltage command value Vd* and the q-axis voltage command value Vq* is executed. However, the process 1) for correcting only the d-axis voltage command value Vd* may be performed. In this case, the emphasis is placed on the torque.

(4) In the third embodiment, during the correction process of step S418, the process 3) for correcting both the d-axis voltage command value Vd* and the q-axis voltage command value Vq* is executed. However, the process 2) for correcting only the q-axis voltage command value Vq* may be performed. In this case, the emphasis is placed on the speed (rotating speed of the motor).

The present examples and embodiments are to be considered as illustrative and not restrictive and the invention is not to be limited to the details given herein, but may be modified within the scope and equivalence of the appended claims.

The invention claimed is:

1. A motor control apparatus comprising:
    a direct-current power source, which outputs a direct-current power source voltage,
    an inverter circuit, which outputs a pulse voltage generated from the power source voltage to a motor,
    a voltage sensor configured to read the direct-current power source voltage in every control cycle, and
    a control unit configured to (a) receive a current command value in every control cycle, (b) calculate a current deviation accumulated value based on a previous current deviation accumulated value, (c) compute a voltage command value in accordance with at least the current deviation accumulated value, and (d) control the inverter circuit based on the voltage command value,
    wherein the control unit is further configured to (e) judge whether the computed voltage command value is saturated by determining in every control cycle whether the computed voltage command value exceeds a voltage (i) which can be output from the inverter circuit and (ii) which is calculated based on the sensed direct-current power source voltage; and (f) restrict the accumulation of the current deviation when the voltage command value is judged to be saturated.

2. The motor control apparatus according to claim 1, wherein the inverter circuit includes a switching element, which generates a pulse voltage by switching the power source voltage, and outputs the pulse voltage to the motor, and the control unit is configured to control the switching timing of the switching element based on the voltage command value.

3. The motor control apparatus according to claim 2, comprising a booster circuit, which boosts a power source voltage output from the direct-current power source and outputs the boosted power source voltage to the inverter circuit,
    wherein the output voltage of the booster circuit is controlled in accordance with a load amount of the motor, and
    wherein the inverter circuit supplies the motor with the pulse voltage, which is generated from the output voltage of the booster circuit by the switching element.

4. The motor control apparatus according to claim 2, wherein the control unit is further configured to:
    set a voltage limit value based on a physical quantity associated with the inverter circuit for judging saturation of the voltage command value;
    compare a value based on the voltage command value with the set voltage limit value in every control cycle, and judge that the voltage command value is saturated if the value based on the voltage command value is greater than the voltage limit value; and
    suppress the current deviation accumulated value from increasing by stopping the accumulation of the current deviation in subsequent control cycle when the voltage command value is judged to be saturated.

5. The motor control apparatus according to claim 4,
    wherein the current command value, the actual current value, the current deviation, the current deviation accumulated value, and the voltage command value are related to two orthogonal axes of a rotational coordinate system associated with a rotor of the motor,
    wherein the voltage limit value is the maximum value of the voltage that can be output from the inverter circuit to the motor in the axial directions of the two orthogonal axes, and
    wherein the control unit is configured to compare the voltage command values of the two axes of the rotational coordinate system with the voltage limit value, and when either of the voltage command values is greater than the voltage limit value, the control unit is configured to judge that the voltage command value is saturated.

6. The motor control apparatus according to claim 4,
    wherein the current command value, the actual current value, the current deviation, the current deviation accumulated value, and the voltage command value are related to two orthogonal axes of a rotational coordinate system associated with a rotor of the motor,
    wherein the voltage limit value is the maximum value of the phase voltage that can be output from the inverter circuit, and
    wherein the control unit is configured to compare a value obtained by combining vectors of the voltage command values of the two axes of the rotational coordinate system with the voltage limit value, and when the value obtained by combining the vectors is greater than the voltage limit value, the control unit is configured to judge that the voltage command value is saturated.

7. The motor control apparatus according to claim 5, wherein, when the voltage command value is judged to be saturated and the current deviation accumulated value of each axis and the current deviation have the same sign, the control unit is configured to accumulate the current deviation in the subsequent control-cycle to suppress the current deviation accumulated value from increasing.

8. The motor control apparatus according to claim 7, wherein, when the voltage command value is judged to be saturated, the control unit is configured to correct the voltage command value related to at least one of the axes such that the computed value obtained by combining the vectors of the voltage command values of the two axes does not exceed the range of the voltage that can be output from the inverter circuit.

9. The motor control apparatus according to claim 8, wherein the two axes are a d-axis and a q-axis, and wherein the control unit is configured to correct the voltage command value related to the d-axis for performing the correction where emphasis is placed on the torque.

10. The motor control apparatus according to claim 8, wherein the two axes are a d-axis and a q-axis, and wherein the control unit is configured to correct the voltage command value related to the q-axis for performing the correction where emphasis is placed on the speed.

11. The motor control apparatus according to claim 8, wherein the two axes are a d-axis and a q-axis, and wherein the control unit is configured to correct the voltage command values related to the d-axis and the q-axis.

12. A method for controlling a motor, comprising the steps of:
    receiving a command value in every control cycle,
    computing a current deviation accumulated value based on a previous current deviation accumulated value, and a voltage command value in accordance with at least the current deviation accumulated value, computing a voltage command value in accordance with at least the current deviation accumulation value, outputting to the motor, a pulse voltage, which is generated by switching a direct-current power source voltage by a switching element of an inverter circuit based on the computed voltage command value, sensing the direct current power source voltage in every control cycle;

judging whether the computed voltage command value causes a voltage saturation exceeding a voltage that can be output from the inverter circuit by calculating the voltage in every control cycle based on the sensed direct-current power source voltage; and restricting the accumulation of the current deviation of the current deviation accumulated value when the voltage command value is judged to be saturated.

13. The method according to claim 12, comprising boosting the power source voltage supplied to the inverter circuit in accordance with the load amount on the motor.

14. The method according to claim 12, comprising:

setting a voltage limit value based on a physical quantity associated with the inverter circuit for judging saturation of the voltage command value; and comparing the value based on the voltage command value with the set voltage limit value in every control cycle, judging that the voltage command value is saturated when the value based on the voltage command value is greater than the voltage limit value, and stopping the accumulation of the current deviation that increases the current deviation accumulated value in the subsequent control cycle.

15. The method according to claim 14, wherein the current command value, the actual current value, the current deviation, the current deviation accumulated value, and the voltage command value are related to two orthogonal axes of a rotational coordinate system associated with a rotor of the motor, wherein the voltage limit value is the maximum value of the voltage that can be output from the inverter circuit to the motor in the axial directions of the two orthogonal axes, and wherein, when judging whether the voltage command value is saturated, the voltage command values of the two axes of the rotational coordinate system are compared with the voltage limit value, and when either of the voltage command values is greater than the voltage limit value, the voltage command value is judged to be saturated.

16. The method according to claim 14;

wherein the current command value, the actual current value, the current deviation, the current deviation accumulated value, and the voltage command value are related to two orthogonal axes of a rotational coordinate system associated with a rotor of the motor, wherein the voltage limit value is the maximum value of the phase voltage that can be output from the inverter circuit, and wherein, when judging whether the voltage command value is saturated, a value obtained by combining vectors of the voltage command values of the two axes of the rotational coordinate system is compared with the voltage limit value, and when the value obtained by combining the vectors of the voltage command values is greater than the voltage limit value, the voltage command value is judged to be saturated.

17. The method according to claim 15, wherein, when computing the voltage command value, when the voltage command value is judged to be saturated and the current deviation accumulated value of each axis and the current deviation have the same sign, the accumulation of the current deviation in the subsequent control cycle is stopped to suppress the current deviation accumulated value of the two axes from increasing.

18. The method according to claim 17, wherein, when the voltage command value is judged to be saturated, the voltage command value related to at least one of the axes is corrected such that the computed value obtained by combining the vectors of the voltage command values of the two axes does not exceed the range of the voltage that can be output from the inverter circuit.

19. The method according to claim 18, wherein the two axes are a d-axis and a q-axis, and the correction is a correction of the voltage command value related to the d-axis for performing the correction where emphasis is placed on the torque.

20. The method according to claim 18, wherein the two axes are a d-axis and a q-axis, and the correction is a correction of the voltage command value related to the q-axis for performing the correction where emphasis is placed on the speed.

21. The method according to claim 18, wherein the two axes are a d-axis and a q-axis, and the correction is a correction of the voltage command values related to the d-axis and the q-axis.

* * * * *